US012735006B2

(12) United States Patent
Rossi et al.

(10) Patent No.: US 12,735,006 B2
(45) Date of Patent: Sep. 15, 2026

(54) CONTROL METHOD AND SYSTEM FOR A BRAKING SYSTEM

(71) Applicant: BREMBO S.p.A., Curno (IT)

(72) Inventors: Alessandro Rossi, Curno (IT); Alfonso Tarantini, Curno (IT)

(73) Assignee: Brembo S.p.A., Curno (IT)

( * ) Notice: Subject to any disclaimer, the term of this patent is extended or adjusted under 35 U.S.C. 154(b) by 0 days.

(21) Appl. No.: 18/693,288

(22) PCT Filed: Sep. 20, 2022

(86) PCT No.: PCT/IB2022/058871
§ 371 (c)(1),
(2) Date: Mar. 19, 2024

(87) PCT Pub. No.: WO2023/047275
PCT Pub. Date: Mar. 30, 2023

(65) Prior Publication Data

US 2025/0121807 A1 Apr. 17, 2025

(30) Foreign Application Priority Data

Sep. 21, 2021 (IT) ........................ 102021000024236

(51) Int. Cl.
*B60T 8/172* (2006.01)
*B60T 8/171* (2006.01)
*B60T 13/74* (2006.01)

(52) U.S. Cl.
CPC .............. *B60T 8/172* (2013.01); *B60T 8/171* (2013.01); *B60T 13/741* (2013.01); *B60T 13/745* (2013.01); *B60T 2220/04* (2013.01); *B60T 2270/82* (2013.01)

(58) Field of Classification Search
CPC .. B60T 8/171; B60T 8/172; B60T 13/74–746; B60T 2220/04; B60T 2270/82
See application file for complete search history.

(56) References Cited

U.S. PATENT DOCUMENTS

| | | | | |
|---|---|---|---|---|
| 9,604,622 | B2 | 3/2017 | Yasui et al. | |
| 10,479,342 | B2 * | 11/2019 | Masuda | B60T 8/3255 |
| 10,899,324 | B2 * | 1/2021 | Yasui | B60T 13/662 |
| 2023/0072617 | A1 * | 3/2023 | Lim | B60T 8/171 |

FOREIGN PATENT DOCUMENTS

| | | | |
|---|---|---|---|
| EP | 3156294 | A1 | 4/2017 |
| JP | 2020093721 | A | 6/2020 |

OTHER PUBLICATIONS

European Patent Office, International Search Report, issued in PCT/IB2022/058871, Jan. 11, 2023, Rijswijk, NL.
Stephen Saric et al, Clamp-Force Estimation for a Brake-by-Wire System: A Sensor-Fusion Approach, IEEE Transactions on Vehicular Technology, Mar. 3, 2008, pp. 778-786, vol. 57, No. 2, IEEE, US, XP011201789.

* cited by examiner

*Primary Examiner* — Mark L. Greene
(74) *Attorney, Agent, or Firm* — Marshall & Melhorn, LLC

(57) ABSTRACT

A control method for a braking system of a vehicle is provided. The control method involves predetermining a clamping force threshold value detectable by a caliper sensor, identifying a defined caliper stiffness model, estimating a clamping force value using the caliper stiffness model, and generating an actuator control signal based on the estimated clamping force value.

8 Claims, 6 Drawing Sheets

CONTROL METHOD AND SYSTEM FOR A BRAKING SYSTEM

FIELD OF THE INVENTION

The present invention concerns a braking system of a vehicle, and refers in particular to a control method for a braking system of a vehicle and to the relative system.

PRIOR ART

In modern vehicles, for example passenger cars, braking systems equipped with electronic BBW technology (from the acronym "brake by wire") braking systems are increasingly widespread.

Within an electronic braking system in BBW technology, during the braking phase, it is essential to know the force exerted by a pair of brake caliper pads on a respective brake disc, in such a way that such force may be modulated by the BBW electronic braking system with a typical closed-loop control system. The value of the force exerted by the caliper is compared to a value of a reference force required for braking, either by the driver of the vehicle or by an electronic driver assistance system, with the aim of ensuring precisely that the braking force reaches said required reference force value.

Such comparison is performed not only in typical cases of a request for braking but also in those specific cases in which the BBW electronic braking system must respond to requests from additional electronic systems that the vehicle may be equipped with such as, for example, the wheels antilock braking system (ABS) or the electronic stability control system (ESC) or in which it must respond to conditions of low adhesion regarding the vehicle itself.

In the prior art, in order to have feedback concerning the level of the applied clamping force, there are two choices:

1. Using a force sensor that covers the entire operating range of the caliper (which may also be a pressure sensor or a torque sensor);
2. Using an estimator that indirectly calculates the applied force based on additional measurements available from the caliper of the BBW system, such as position, current and temperature.

Option 1 has some limitations in relation to feasibility, costs, resolution/accuracy, and reusability.

With regard to feasibility, in some cases it is not possible to have a sensor that is capable of reading the entire operating range of the brake caliper in the small space available within the caliper itself.

With regard to the costs, developing and validating a sensor with an extended reading range may be very expensive.

With regard to resolution/accuracy, in a sensor, the sensor reading range, accuracy and resolution are interrelated characteristics and may not be determined independently: an increase in the sensor reading range may result in a loss of accuracy and resolution.

With regard to reusability, unless a sensor with a very wide range is used, even in actuators where a lower reading range is required, the sensor with the appropriate range for each application must be chosen and the same sensor cannot be used in multiple applications with different ranges, for example for different vehicle ranges.

Option 2 has the limitation that an estimate is subject to many uncertainties and variability over the life of the components, for example due to variations in efficiency, pad wear, variations in actuator and caliper production parameters, thermal effects, variations in friction forces, etc. These aspects may lead to estimates with poor levels of accuracy, especially during the first part of a low force braking event and when the pad-disc contact point must instead be determined and detected with high accuracy.

SUMMARY OF THE INVENTION

The object of the present invention is to propose a control method and system for a braking system capable of overcoming, at least in part, the limitations and disadvantages of the solutions of the prior art.

This purpose is achieved by a control method for a braking system and a control system as described and claimed herein.

Some advantageous embodiments are the subject of the dependent claims.

FIGURES

Further features and advantages of the method and related system according to the invention will result from the description below of preferred embodiments thereof, provided purely by way of non-limiting example, with reference to the accompanying figures, wherein.

Figures 4, 4A:
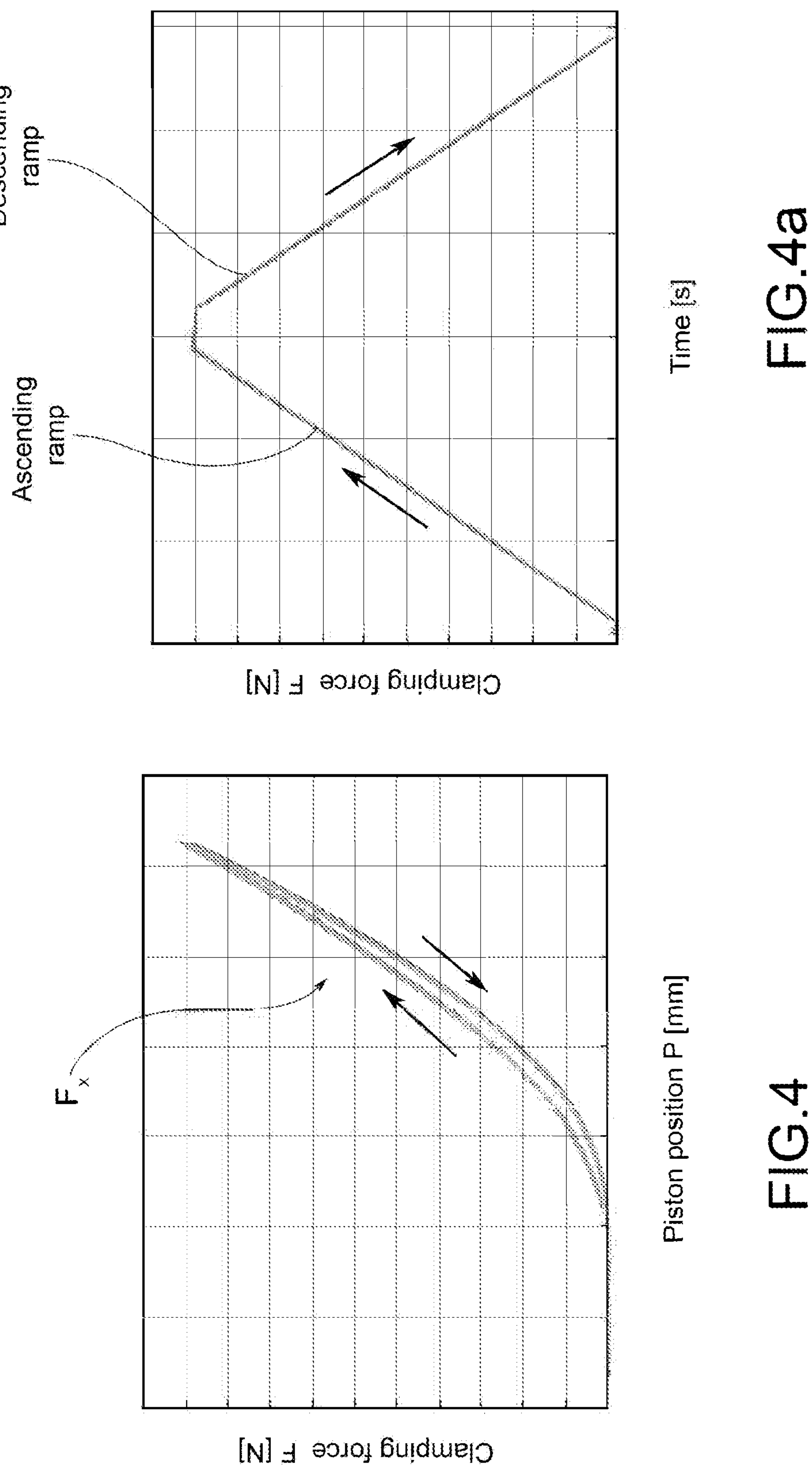
Figure 5:
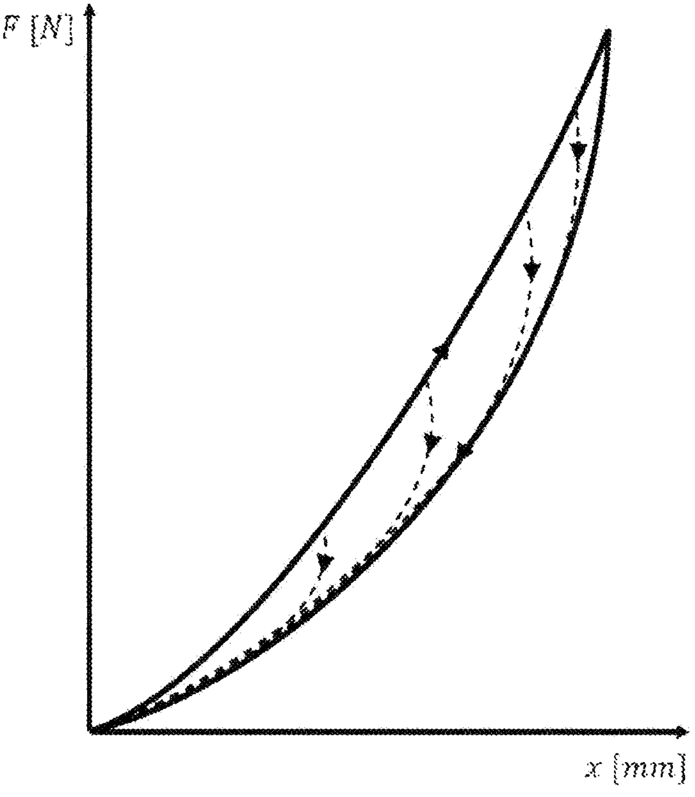
Figure 6:
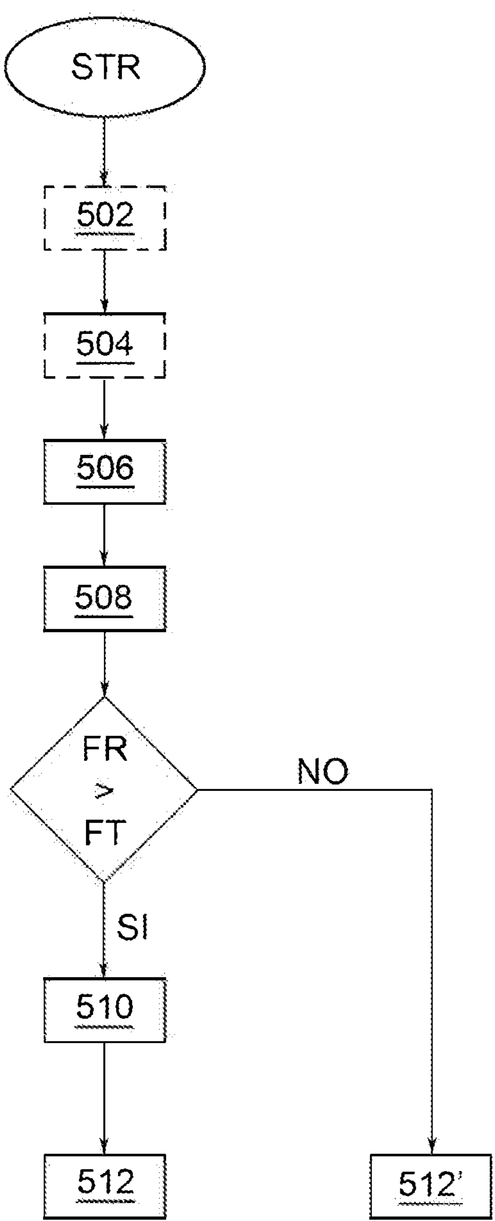

FIGS. 4 and 4*a* are two stiffness curves graphs comparing force and movement and force and time, respectively, which include the hysteresis characteristic of the caliper;

FIG. 5 is another stiffness curve graph comparing force and movement with hysteresis, representing the phenomenon of transients between the rise curve and the fall curve of the clamping force; and FIG. 6 is a flowchart of a control method for a braking system of a vehicle, according to an embodiment of the invention.

DETAILED DESCRIPTION

In the accompanying drawings, 1; 100 is used to indicate as a whole and in schematic form an electronic control system for a braking system, in some embodiments of the invention. In particular, the control system finds application in a distributed architecture Brake-By-Wire braking system, wherein each corner of the vehicle is independently controlled, in closed loop mode, so as to minimize the error between the value of the target braking force, or reference (FR) braking force, and the intensity of the braking force actually applied by the brake caliper.

It should be noted that the value associated with the braking target and the intensity of the force applied by the caliper may depend on the control strategies adopted, the sensor used or the topology of the corner, and may be, for example, but not limited to, force, pressure or torque. These measurements are interrelated and may easily be converted into one another; therefore, in the description that follows, such interrelated quantities shall be generically referred to as "force" or "clamping force".

Furthermore, elements common to the various embodiments are indicated with the same reference numbers.

For the purposes of this description, the term 'vehicle,' not shown in the figures, refers to any vehicle or motor vehicle, also of a commercial type, having two, three, four or more wheels.

Furthermore, the term 'braking system,' also not shown in the figures, refers to a set of all of the components (from mechanical and/or electrical or electronic components up to the braking fluid) that contribute to the generation of the service braking of a vehicle or to the generation of the parking braking of a vehicle.

Figure 1:
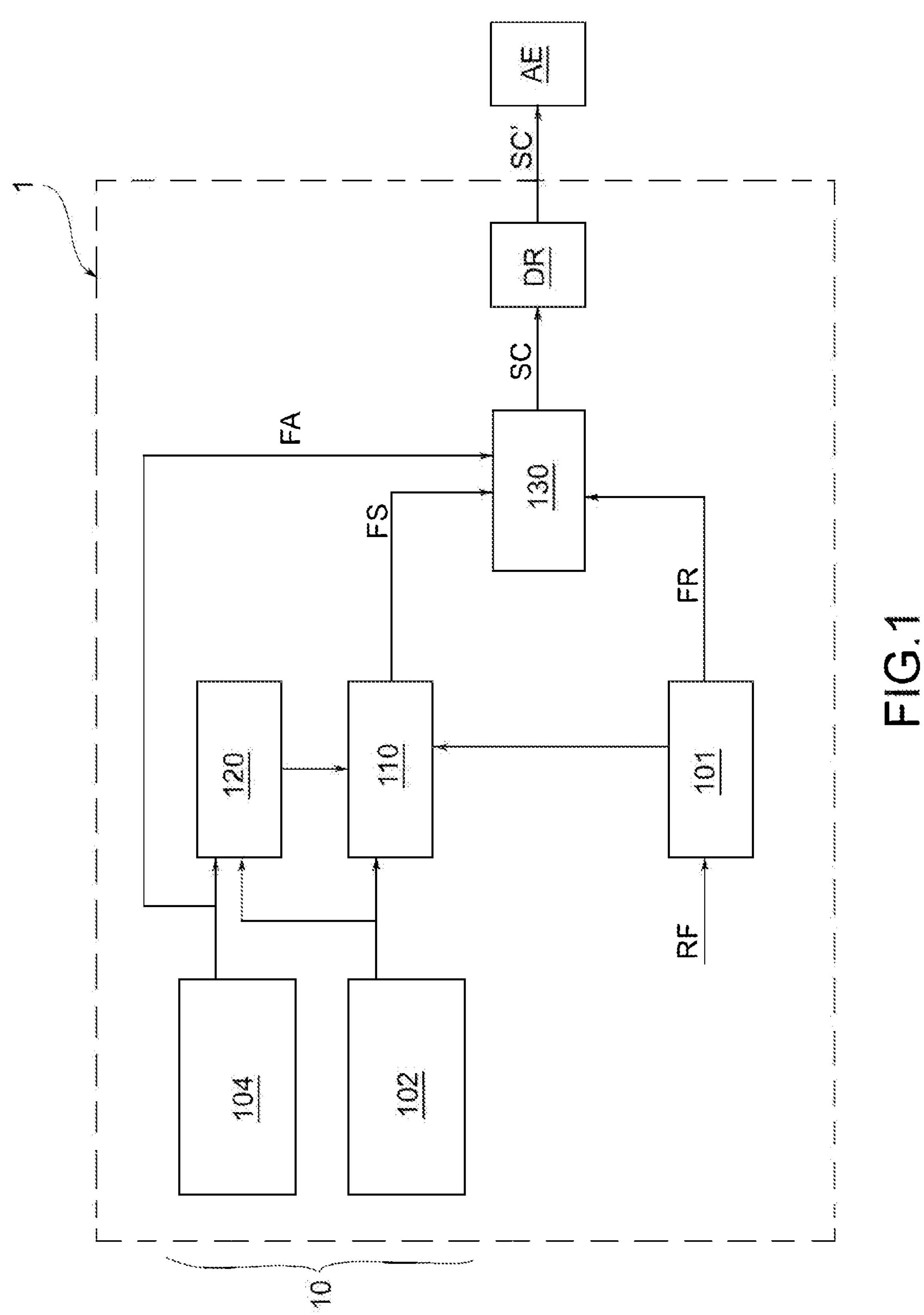
FIG. 1 shows, by means of a block diagram, an electronic control system for a braking system of a vehicle, according to an embodiment of the invention.
Figure 2:
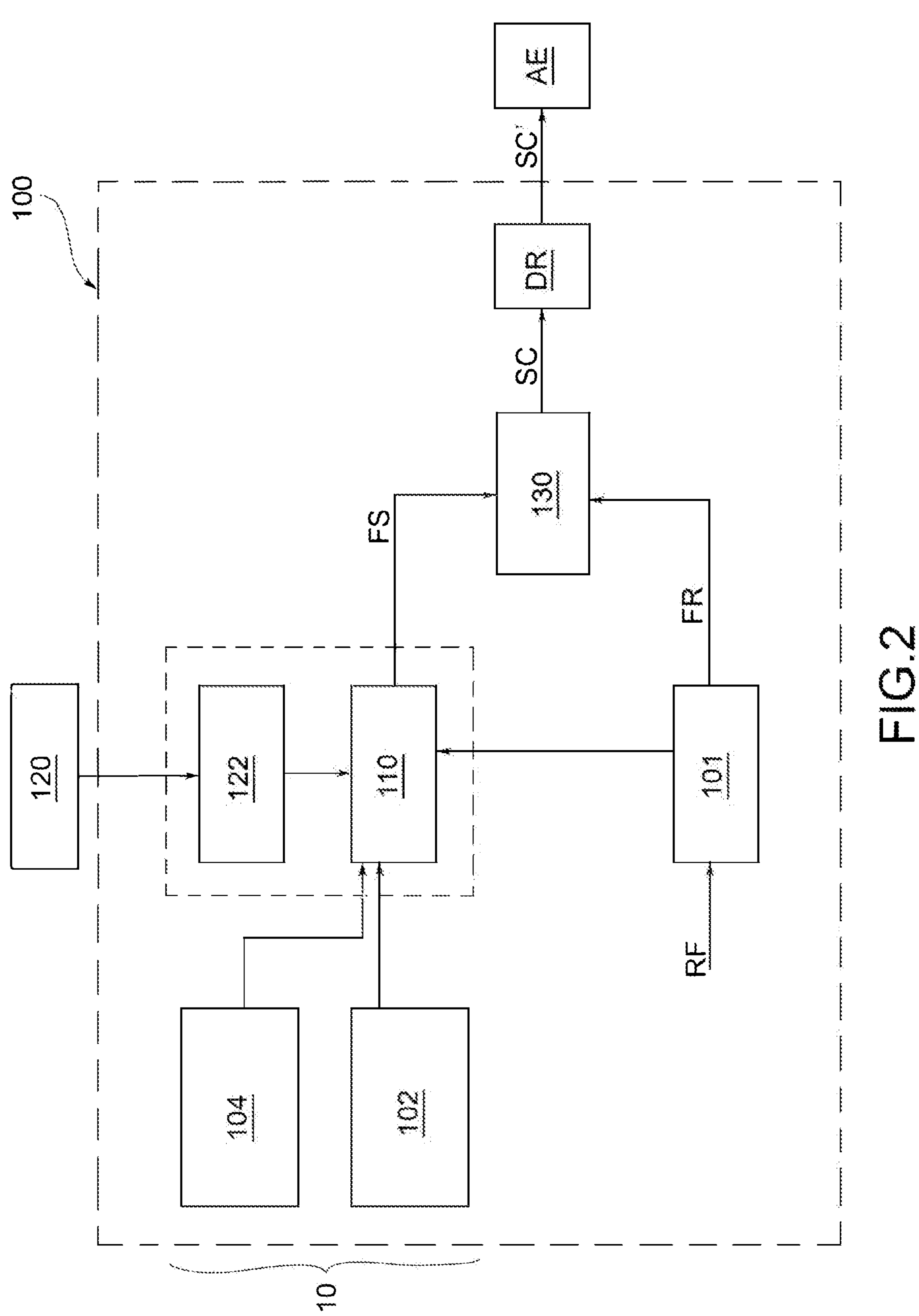
FIG. 2 shows, by means of a block diagram, an electronic control system for a braking system of a vehicle, according to a further embodiment of the invention.

FIGS. 1 and 2 represent block diagrams of possible embodiments of the system 1.

In some embodiments, the control system comprises a vehicle control module 101.

The vehicle control module 101, for example a hardware module and/or software logic within a main hardware module, is configured, among the tasks for which it is intended, to receive a braking request RF (deceleration request).

This braking request RF may come from a brake pedal (not shown in the figures) operable by the driver of the vehicle, and may be processed, for example, by an EBD logic (Electronic Brake-force Distribution, not shown in the figures) implementable by the vehicle control module 101 or may come from an automatic vehicle driving assistance logic, for example an AEB logic (Autonomous Emergency Brake, also not shown in the figures).

The vehicle control module 101 may be configured to determine a reference force value FR based on the braking request RF and possibly other information coming from sensors associated with the braking or, in system, general, the vehicle.

In other embodiments, the vehicle control module 101 is external to the control system 1; 100 which is the object of the present invention, and provides the control system 1; 100 with the value of the reference force FR.

The system 1; 100 further comprises one or more corner detection devices 10 operatively associated with a corner of a vehicle.

These corner detection devices 10 are configured to detect corner information that is representative of the braking system at a corner of the vehicle. For the purposes of this description, the phrase "corner information representative of the braking system at a vehicle corner" in fact refers to information relating to each braking device, even if not necessarily physically located at the relative corner.

The corner detection devices 10 comprise actuator sensors 102 that are suitable for acquiring information in relation to the status of the caliper actuator, for example an electro-mechanical or electro-hydraulic actuator, which is operable in order to command the clamping and release of the respective brake caliper.

In more detail, in some embodiments, the actuator sensors 102 comprise position sensors, electrical voltage sensors, electrical current sensors, temperature sensors, and so on.

In such a case, the information acquired by the actuator sensors 102 is, for example:

- the position of the electro-mechanical or electro-hydraulic actuator of the brake caliper;
- quantities derived from the position of the electro-mechanical actuator of the brake caliper such as, for example: speed, acceleration or the derivative of the acceleration (snatch or jerk);
- the electrical supply voltage/PWM (Pulse Width Modulation) of the electric motor that is suitable for moving the electro-mechanical or electro-hydraulic actuator and further derived quantities (for example, electrical voltage peaks, filtered average, electrical power derived from an electric current and so on);
- the electrical current absorbed by the electric motor and further derived quantities (for example, electrical current peaks, filtered average, electrical power derived from an electrical voltage, estimated consumption, efficiency and electrical power absorbed and so on);
- the external temperature of the electro-mechanical or electro-hydraulic actuator and/or the electric motor.

The corner detection devices 10 further comprise, for each corner, a force sensor 104 that is suitable for acquiring information in relation to the clamping force applied by the brake caliper on the brake disc.

In one embodiment, the force sensor 104 is suitable for measuring the clamping force exerted by the brake caliper, at least within a range limited to the first part of the operating range of the brake caliper, that is the first part of the electro-mechanical actuator piston stroke or, in the case of an electro-hydraulic actuator, the first part of the pump float stroke or of the caliper piston stroke.

In other words, the force sensor 104 may have a lower force reading range than the operating range of the brake caliper.

In other embodiments, the force sensor 104 is, or is used to function as, a binary sensor, that is, a force switch, which is only suitable for detecting whether the clamping force exerted by the caliper exceeds a predetermined threshold value. In this case, for example, the corner information comprises information representative of the start of the force phase by the electro-mechanical actuator, that is information (for example a "flag") representative of the start of the loading phase, in which the piston of the electro-mechanical or electro-hydraulic actuator begins to exert force and passes from a no-load position to a position in which it begins to load on the brake caliper.

The system 1 further comprises a force estimator module 110 configured to determine an estimated force value FS based on a clamp stiffness model represented by a theoretical stiffness curve Fx that relates the clamping force applied by the actuator with the position P of the piston of the electro-mechanical or electro-hydraulic actuator.

The caliper stiffness model is provided with a stiffness modeling module 120.

In an embodiment shown in FIG. 1, wherein the system employs a force sensor 104 configured to measure the clamping force, at least within a range limited to the lower part of the caliper operating range, the stiffness modeling module 120 constructs the theoretical stiffness curve Fx based on the information acquired from the force sensor and information regarding the caliper actuator status. In the following description some examples will be described of model building algorithms.

In this embodiment, the force estimator module 110 is configured to estimate the theoretical stiffness curve within a clamping force range that is beyond the sensor reading range and up to the maximum clamping force value of the in any case beyond a certain predetermined clamping force threshold value within the sensor reading range, for example, below which the measurement accuracy of the sensor is satisfactory and above which the measurement accuracy of the sensor is not considered satisfactory.

In some embodiments, the electronic control system is configured to use the clamping force information coming from the force sensor if the reference force value FR is below the threshold value established for the force sensor, and to use the estimated force value FS if the reference force value FR is higher than the threshold value.

In other words, the stiffness model is used to estimate the force beyond the sensor reading range in order to provide closed-loop control feedback throughout the operating range of the corner.

For example, the comparison between the reference force value FR and the threshold value may be performed by the force estimator module 110 on the basis of information coming from the actuator sensor 102, for example the position of the electro-mechanical actuator piston.

The system 1; 100 also includes a brake control module 130.

The brake control module 130, for example a hardware module and/or software logic within a main hardware module, is configured to receive the signal that is representative of the estimated force value FS, coming from the estimator module, and the signal representative of the real force FA detected by the force sensor. The brake control module 130 is configured to compare one of these two signals (for example depending on whether the reference force value FR is below or above the predetermined threshold value) with the reference force value FR and to generate a control signal SC for an electro-mechanical or electro-hydraulic actuator of a brake caliper of the braking system (which actuator is schematically represented outside the system 1; 100 and indicated by reference AE) on the basis of that comparison.

It should be noted that the control signal SC is, for example, the reference value (set point) of an electrical current or electrical voltage (PWM) to be supplied to the electro-mechanical actuator AE of the brake caliper.

In one embodiment, the system 1 also comprises an electronic drive module DR of the electro-mechanical actuator AE.

The brake control module 130 may be configured to provide the control signal SC to the electro-mechanical actuator AE by means of the electronic drive module DR.

The drive module DR is configured to receive the control signal SC, and therefore a braking demand level (percentage/PWM), consequently generating a drive signal SC' to be provided to the electro-mechanical actuator AE, for example an electric drive current to be provided to the electric motor that is suitable for moving the electro-mechanical actuator AE.

In one embodiment, the stiffness modeling module 120 is configured to model the theoretical stiffness curve with a parabolic, cubic or exponential curve, based on the characteristics of the caliper within the reading range of the force sensor.

In more detail, in some embodiments the stiffness modeling module 120 is configured to model the theoretical stiffness curve in one of the following two ways, depending on the characteristics of the caliper (for example, based on geometry, friction, etc.).

If, for example, during an “offline” system development and testing phase, it is found that the identified model, for example the parabolic, cubic or exponential correctly represents the entire operating range of the caliper, the identified model may be constructed on the basis of information obtainable from the sensor within the reading range thereof, and the same curve may be used to estimate the force in the upper part of the operating range of the caliper, that is beyond the reading range of the sensor or in any case beyond the preset threshold value.

If, on the other hand, it is found that the identified model, for example the parabolic, cubic or exponential curve, correctly represents only the lower part of the operating range of the caliper, in which the sensor reading may be used, the identified model is then used to carry out a linear extrapolation in order to extend the model in the upper part of the operating range of the caliper, that is outside the area covered by the sensor, in which the stiffness of the caliper may be better identified as a linear curve instead of a parabolic, cubic or exponential curve.

Figure 3:
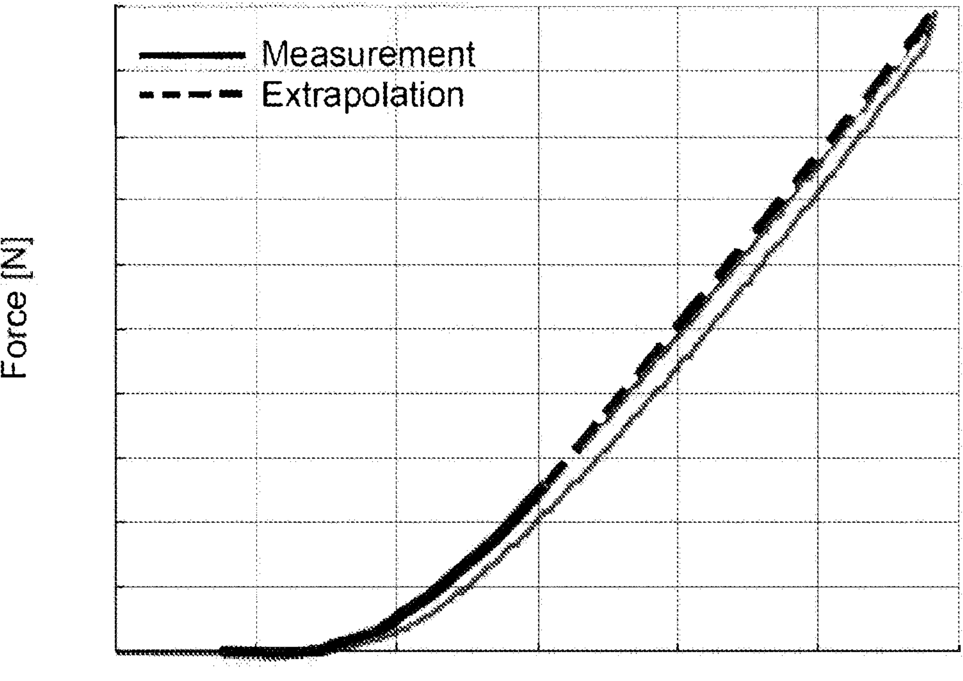
FIG. 3 is a stiffness curve graph comparing force and movement, partly measured and partly estimated, obtained according to an embodiment of the control method according to the invention.

In other words, as may be seen from FIG. 3, if the model fits only the lower part of the operating range, in this lower part the curve has a non-linear characteristic, for example a parabolic or cubic characteristic. The upper part (represented by the dashed-line) is extrapolated from the model starting from the slope of the final section of the lower part and the extrapolation has a linear characteristic.

The stiffness modeling module 120 may be configured to implement a model identification routine according to various strategies.

A first strategy is to identify the model in real time at each new braking system control cycle, using new information coming from the force sensor.

According to a second strategy, the identification of the model is performed only when predefined and intermediate force threshold values are reached (that is, below the sensor threshold value) during a braking event. The intermediate force thresholds may be chosen at a constant interval (for example every 1000N) or they may be distributed by increasing the number of samples within the area where there is the greatest non-linearity and reducing those samples where the curve is more linear or almost linear.

According to a third strategy, the identification of the model is performed once per braking event, after collecting all of the data from the force sensor, and, for example, when the actuator is not braking.

In some embodiments, the caliper stiffness modeling module may be configured to add, during the model fitting step, an obsolescence parameter associated with the data used. In fact, it may happen that there are many data available in the lower part of the operating range of the caliper, where most of the braking event occurs, and little data at high levels of force. The data relating to high levels of force may therefore also be old, relating to braking events that occurred even much earlier than the braking event that the system is controlling.

The fitting algorithm may therefore provide for the introduction, during the modeling step, 41 of an obsolescence parameter associated with the available data so that the most recent data have greater weight than the older data. This allows the model estimation process to use available information on the entire operating range of the sensor, but to be more responsive to the change in stiffness, for example, due to wear of the pads or the thermal effect on the disc and caliper.

It should be noted that the choice of to the execution frequency of the model identification routine may result from a trade-off between the need to frequently refresh the model and the optimization of the computational load.

In an embodiment shown in FIG. 2, which employs a binary force sensor 104, that is configured or used only to provide information about reaching a predefined clamping force threshold value, the stiffness model is obtained during an electronic control system configuration step, that is, in “offline” mode. For example, in this case, measurements of the position of the caliper actuator piston and the caliper clamping force may be performed by means of an external sensor during a force ramp and collected data are used to determine the parameters of the stiffness model.

The binary force sensor 104, in other words, senses whether or not there is clamping force. The perceived force may be the pad-disc contact force. The sensor detects the presence of a force, for example, when the force exceeds a certain predetermined threshold. When this threshold is exceeded, the estimator module applies the model provided by the stiffness modeling module 120 (which in FIG. 2 is represented outside the control system) so as to obtain the estimated force value FS as a function of information received from the actuator sensor 102.

In this case, the control system 100 may comprise a storage module 122 in which the stiffness model obtained "offline" from the stiffness modeling module 120 is stored. The storage module 122 is accessible by the force estimator module 110.

In some embodiments, the stiffness modeling module is configured to account for the hysteresis effect present on the caliper so that the curve of the increase of clamping force does not coincide with the curve of the decrease of the force when the required force is reduced.

In more detail, in one embodiment, the stiffness modeling module is configured to implement this hysteresis effect by identifying the stiffness model only for the phase of increasing the force and deriving the decreasing phase of the curve by means of translating the model by a predefined amount.

FIG. 4 shows a stiffness curve Fx as a function of the position of the piston, which includes the hysteresis effect of the caliper. A decreasing phase of the clamping force is noted, which is substantially a translation of the ascending phase. FIG. 4*a* shows the same stiffness curve, but as a function of time. In an embodiment variant, two models are instead identified using information coming from the force sensor, both during the application phase and during the release phase of the braking event.

In both cases, once the two curves have been obtained, the modeling module is configured to implement such a mechanism to connect the two curves when a certain force modulation is required and the actuator changes direction from a force-increasing phase to a force-decreasing phase, or vice versa.

In particular, as shown in FIG. 5, the modeling algorithm implements some additional transition curves that may be identified and modeled as a linear behavior, a parabolic curve, a cubic curve, an exponential curve or a filter based on the actual behavior of the caliper.

To properly implement this mechanism, the modeling module may receive from the sensor that detects the position of the piston of the electro-mechanical or electro-hydraulic actuator AE (or other related information), information concerning the direction of movement of the actuator (during application or release).

In some embodiments, the force sensor 104 is mechanically integrated into the electro-mechanical or electro-hydraulic actuator. Such integration might be implemented according to alternative embodiments.

For example, in one embodiment, the force sensor is always subjected to the applied force, also above the clamping force threshold value. In this embodiment, the sensor must be mechanically designed to withstand the entire range of caliper forces without permanent deformation or damage. In terms of the measured force, it may be designed to provide a measurement only up to the threshold value reaching the full scale of the interface (a solution that offers maximum resolution). Alternatively, the sensor may have a wider interface scale but provide a measurement with less accuracy above the threshold value.

In one embodiment, the sensor is integrated with a mechanical design that allows the sensitive section of the sensor to be stressed only up to the clamping force threshold value. This solution allows the sensitive section of the sensor to be designed to withstand only one force, up to the threshold value, without the need for a mechanical structure that is capable of withstanding the entire force range of the caliper.

Referring now to the block diagram of FIG. 6, a control method 500 for a braking system of a vehicle according to the present invention is described.

The method 500 comprises a symbolic start step STR.

The method involves predetermining 502 a clamping force threshold value FT that detectable by the caliper sensor, such threshold value FT being lower than the maximum clamping force value that executable by the caliper.

As mentioned above, the clamping force threshold value FT may be the maximum value of the sensor reading range, or a threshold value chosen as a function of the accuracy of the caliper sensor.

The method 500 comprises a step for receiving 506 a reference force value FR.

In some embodiments, the reference force value FR is received 504 by a vehicle control module 101 that, based on a braking request RF, generates the reference force value FR.

The method also comprises a step of identifying 508, by means of a caliper stiffness modeling module, a caliper stiffness model defined by a theoretical stiffness curve that relates the clamping force applied by the caliper with the position of the caliper actuator.

If the reference force value FR is higher than the threshold value FT, the method comprises the step of estimating 510, by means of a force estimator module 110, a clamping force value FS using the caliper stiffness model and information correlated to the position of the electro-mechanical actuator.

The method also comprises the step of generating 512, by means of a brake control module 130, an actuator control signal based on the estimated clamping force value FS and the reference force value FR.

In one embodiment wherein the caliper sensor has a reading range from zero at least up to the threshold value FT, if the reference force value FR is lower than the threshold value FT the method comprises a step of generating 512', by means of the brake control module, an actuator control signal SC based on the actual clamping force value FA measured by the caliper sensor.

In one embodiment wherein the caliper sensor has a reading range from zero at least up to the threshold value, the step of identifying 508 is performed based on clamping force information detected by the caliper sensor as a function of caliper actuator status information.

In one embodiment, the step of identifying 508 comprises generating a theoretical stiffness curve of a parabolic, cubic or exponential type over the entire operating range of the caliper.

In one embodiment variant, the step of identifying 508 comprises generating a theoretical stiffness curve having, in the range of forces up to the threshold value, a first parabolic, cubic or exponential section, and a second linear section, beyond the threshold value, obtained by linear extrapolation starting from the slope of the final portion of the first curve section.

In one embodiment of the method, the step of identifying 508 is performed in real time at each new cycle of acquiring information provided by the caliper sensor.

In one embodiment variant of the method, the step of identifying 508 is performed at the end of a braking event using a plurality of information provided by the caliper sensor during the braking event.

In a further embodiment variant of the method, the step of identifying 508 is performed during a braking event each time the predetermined force sub-thresholds are exceeded within the range of forces up to the threshold value.

In one embodiment of the method, the step of identifying 508 comprises a step of assigning, by means of the force estimator module, greater weights to the most recent clamping force information provided by the caliper sensor.

In an embodiment variant of the method, a binary caliper sensor is used that is suitable for providing clamping force presence information when the clamping force reaches a predetermined threshold value.

In one embodiment of the method, the step of identifying 508 further comprises a step of estimating the caliper hysteresis effect, said step of estimating comprising a translation of a predetermined amount of the theoretical stiffness curve that represents the phase of the force application.

In one embodiment variant, the step of estimating the hysteresis effect is based on a detection of the clamping force of the caliper by the caliper sensor during the braking event release phase.

Some advantages of the control method and related system described above will be highlighted hereinafter.

Using a combination of a sensor with a limited reading range together with a force estimation algorithm in order to extend the measurement to the entire operating range of the caliper has several advantages over prior art solutions that involve the use of a higher range sensor or only the use of an estimate of the force.

Compared to the choice of using only a force estimator algorithm, also having a force sensor allows for the precise detection of the point of contact, and ensures the correct identification of the dispersion of the parameters and stiffness due to the thermal effect, wear and aging of the components.

Furthermore, the estimation of the pad wear on an electromechanical caliper is more precise, and the corner control at low levels of force has greater accuracy, thereby providing a better experience for the driver.

Compared to using a sensor with the maximum reading range, using a sensor with a limited range allows for the optimization of accuracy and resolution in the most critical area, at low levels of force, where a "small" error becomes more relevant when compared to the actual force required. Furthermore, a sensor with a limited reading range may be designed to withstand contained forces, and therefore with reduced packaging that is better suited to a BBW system actuator, with optimizations also in terms of production costs.

Finally, the proposed solution allows to adopt an easily scalable force sensor for different applications with different ranges of force: the same physical sensor will always measure and be subjected to the same clamping force threshold value, while only the algorithm for estimating the force above the threshold value may require customization in order to extend and adapt the scale to the entire operating range.

To the embodiments of the control method and system for a braking system according to the invention, a person skilled in the art may, in order to meet contingent needs, make changes, adaptations, and replacements of elements with functionally equivalent ones, without departing from the scope of the following claims. Each of the features described as belonging to a possible embodiment may be obtained independently of the other described embodiments.

The invention claimed is:

1. A control method for a braking system of a vehicle, wherein the braking system comprises at least one brake caliper, a caliper actuator actuatable to cause clamping and releasing of the brake caliper, and a caliper sensor suitable for detecting a magnitude correlated to the clamping of the brake caliper, the method comprising steps of:

predetermining a clamping force threshold value detectable by the caliper sensor, said clamping force threshold value being lower than a maximum clamping force value exercisable by the brake caliper;

receiving a reference force value;

identifying, by a caliper stiffness modeling module, a caliper stiffness model defined by a theoretical stiffness curve which relates a clamping force applied by the brake caliper with a position of the caliper actuator;

estimating, by a force estimator module, a clamping force value using the caliper stiffness model and information correlated to the position of the caliper actuator, and generating, by a brake control module, an actuator control signal based on the estimated clamping force value and the reference force value;

wherein the caliper sensor is a binary sensor suitable for providing clamping force presence information when the clamping force reaches the threshold value.

2. The method of claim 1, wherein the reference force value is received by a vehicle control module that generates the reference force value based on a braking request.

3. The method of claim 1, wherein the step of identifying the caliper stiffness model comprises generating a theoretical stiffness curve of a parabolic, cubic, or exponential type over an entire operating range of the brake caliper.

4. The method of claim 3, wherein the step of identifying the caliper stiffness model is performed in real time with each new cycle of acquiring information provided by the caliper sensor.

5. The method of claim 1, wherein the step of identifying the caliper stiffness model comprises generating a theoretical stiffness curve having, in a range of forces up to the threshold value, a parabolic, cubic, or exponential first curve section, and a second linear section, beyond the threshold value, obtained by linear extrapolation starting from a slope of a final portion of the first curve section.

6. The method of claim 1, wherein the step of identifying the caliper stiffness model further comprises a step of estimating a caliper hysteresis effect, said step of estimating the caliper hysteresis effect comprising a translation of a predetermined amount of a measured stiffness curve that represents an increasing trend of the clamping force in a braking event.

7. The method of claim 1, wherein the step of identifying the caliper stiffness model further comprises a step of estimating a caliper hysteresis effect, said step of estimating the caliper hysteresis effect being based on a detection of the clamping force of the brake caliper by the caliper sensor in a step of releasing a braking event.

8. A control system of a braking system of a vehicle, comprising:

a force sensor operatively associated with a brake caliper of a corner of the vehicle;

an actuator sensor operatively associated with an electromechanical or electro-hydraulic brake caliper actuator;

a caliper stiffness modeling module;

a strength estimator module; and a braking control module;

said control system being configured to perform the steps of the control method of claim 1.

* * * * *